United States Patent [19]

Smith

[11] 4,175,276
[45] Nov. 20, 1979

[54] TRANSFORMER INRUSH CURRENT DETECTOR

[75] Inventor: Russell M. Smith, North East, Pa.

[73] Assignee: General Electric Company, Erie, Pa.

[21] Appl. No.: 844,773

[22] Filed: Oct. 25, 1977

[51] Int. Cl.² .............................................. H02H 7/04
[52] U.S. Cl. ....................................... 361/36; 361/58; 361/87
[58] Field of Search ...................... 361/35, 36, 87, 58, 361/93, 110, 111; 323/89 P, 89 R, 89 M, 56, 62

[56] References Cited

U.S. PATENT DOCUMENTS

| | | | |
|---|---|---|---|
| 2,196,411 | 4/1940 | Geise | 361/110 |
| 3,374,398 | 3/1968 | Horn et al. | 361/87 |
| 3,731,150 | 5/1973 | Weiser | 361/58 |

OTHER PUBLICATIONS

IEEE Transactions on Power Apparatus and Systems, vol. PAS-94, No. 6, Nov./Dec. 1975, "A Three Phase Differential Relay for Transformer Protection" by Einvall et al., pp. 1971-1980.

Primary Examiner—Patrick R. Salce
Attorney, Agent, or Firm—A. S. Richardson, Jr.

[57] ABSTRACT

To detect a d-c component of alternating current in the primary winding of an electric power transformer, a pair of current transducers are provided. Each current transducer has a saturable core adapted to be magnetized by the same current as flows in the transformer primary winding, and bias means associated with both transducers presaturate their respective cores in opposite directions by equal predetermined amounts of magnetomotive force. Secondary windings on the cores of the respective current transducers are connected to means for deriving an output signal in response to voltage induced in one but not both of the secondary windings as a result of alternating current containing a d-c component in the power transformer if such current has sufficient magnitude to unsaturate the core of one of the current transducers, a condition typifying the surge of inrush magnetizing current that flows in the transformer primary when initially energized.

6 Claims, 3 Drawing Figures

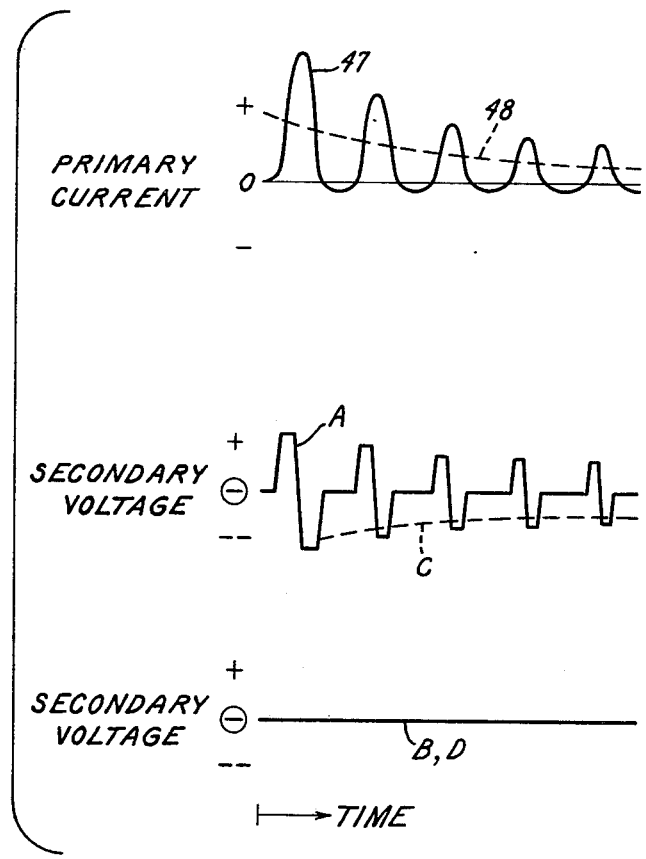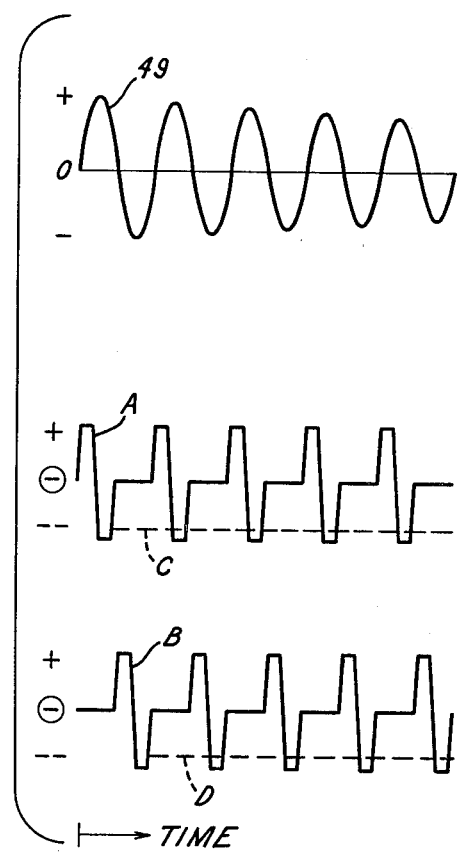

TRANSFORMER INRUSH CURRENT DETECTOR

BACKGROUND OF THE INVENTION

This invention relates generally to asymmetrical alternating current detecting means and more particularly to means for detecting a direct current component of inrush current in an electric power transformer.

When a power transformer is connected for energization to a source of alternating current (a-c), the resulting magnetizing inrush current in its primary windings may contain a component of direct current (d-c) having a magnitude that initially is large and then decays on a time function determined by the apparent induction of the transformer. The existence and size of the d-c component of inrush current will depend on the residual magnetism in the transformer core and on the part of the alternating voltage wave at which the connection to the a-c source happens to be initiated, and in a worst case condition the magnitude of this component during the initial half cycle of fundamental current can be over 50 per cent of the amplitude of the fundamental alternating current. During succeeding cycles of inrush current the transformer comes out of saturation and the d-c component concurrently decreases toward zero, and at the same time the transformer inductance is increasing so that the d-c component persists for a longer period than might be expected from the initially existing conditions.

The d-c component of transformer inrush current is generally undesirable. It can be a problem particularly in the case of power transformers onboard electrically propelled locomotives or other traction vehicles that run on rails or guideways and utilize wayside sources of a-c power. Such transformers are subject to momentary interruptions of power due to phase breaks in the wayside power conductors (e.g., overhead catenaries) or physical bouncing of the vehicles' current collectors (e.g., pantographs). If reenergization of the transformer were to occur at an unfavorable instant when the source voltage wave is in the vicinity of a zero crossing, the resulting d-c component of inrush current, if not constrained, can sometimes interfere with proper operation of certain types of vehicle warning and protective systems that rely on signals transmitted over the wayside power conductors or rails to detect track occupancy. A relatively high and prolonged d-c component of transformer inrush current in the same conductors or rails could transiently appear as a false "track clear" signal to a track occupancy relay if the relay is of a type utilizing direct current detecting means.

Accordingly, the general objective of the present invention is to provide improved means for detecting and attenuating the d-c component of magnetizing inrush current in a power transformer.

Others have previously proposed harmonic current responsive means for detecting the presence of a d-c component of transformer current. This prior art approach is not capable of accurately discriminating between relatively large and small amounts of the d-c component. In many applications there is no need for the detector to operate if the d-c component has insufficient magnitude and duration to cause possible harm, and therefore another object of this invention is the provision, for detecting the d-c component of transformer current, of a system that responds only when the d-c component exceeds a predetermined threshold level.

SUMMARY OF THE INVENTION

In carrying out my invention in one form, the d-c component of inrush current in a power transformer winding is detected by means of a system including a pair of current transducers each having a saturable core adapted to be magnetized by alternating current flowing between the transformer winding and an a-c source that is subject to interruptions. The current transducers have secondary windings on their respective cores, and bias means is associated therewith for presaturating the cores in opposite directions by equal predetermined amounts of magnetomotive force to establish the threshold level of the detecting system. The system further includes means connected to the secondary windings of both current transducers for deriving an output signal in response to voltage induced in one of the secondary windings as a result of transformer inrush current containing a d-c component and having a peak magnitude sufficient to unsaturate the associated core. The last-mentioned means is arranged to prevent the output signal from being derived whenever voltages of substantially equal magnitudes are induced in both of the secondary windings due to the peak magnitudes of both positive and negative half cycles of transformer current exceeding the aforesaid threshold level, a condition indicating that transformer inrush current has an essentially symmetrical waveform and hence cannot contain an appreciable d-c component. In a preferred embodiment of the invention, means responsive to the output signal of the detecting system is provided for inserting a resistor in series with the alternating current flowing between the power transformer winding and the a-c source to attenuate the detected d-c component of transformer current.

My invention will be better understood in its various objects and advantages will be more fully appreciated from the following description taken in conjunction with the accompanying drawings.

BRIEF DESCRIPTION OF THE DRAWINGS

FIG. 2 is a family of traces showing in idealized form several cycles of transformer inrush current having a maximum d-c component and showing the resulting voltages that are induced in the secondary windings of the saturable current transducers of the inrush current detecting system shown in FIG. 1; and FIG. 3 is another family of traces showing in idealized form several cycles of transformer inrush current having no appreciable d-c component and also showing the resulting voltages induced in the secondary windings of the same current transducers.

DESCRIPTION OF THE PREFERRED EMBODIMENT

Figure 1:
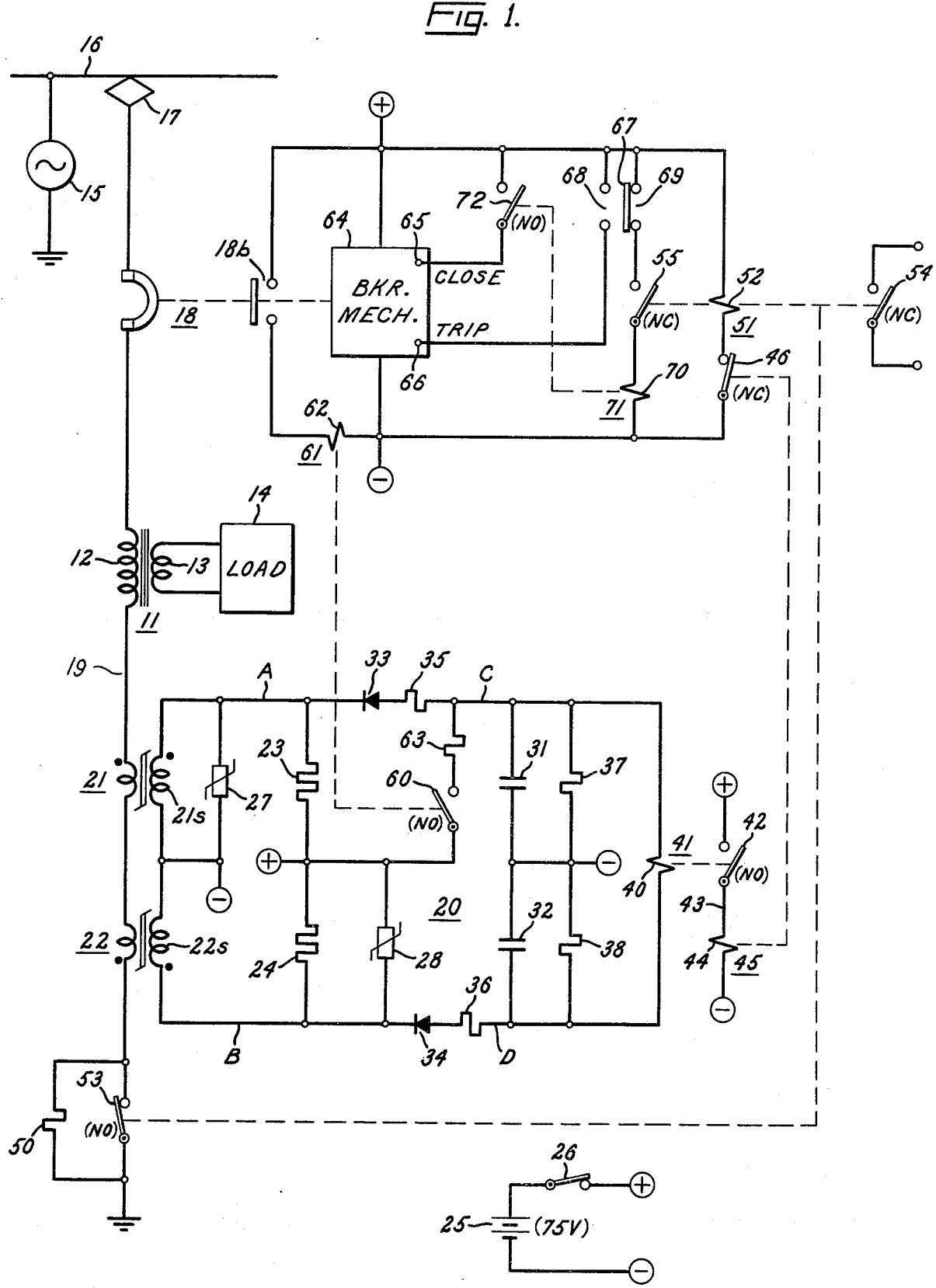
FIG. 1 is a schematic circuit diagram of a power transformer inrush current detecting system illustrating a presently preferred embodiment of my invention.

Referring not to FIG. 1, there is shown a conventional electric power transformer 11 comprising a single-phase high-voltage primary winding 12 and at least one lower voltage secondary winding 13 on a symbolically illustrated core of magnetizable material. While only one secondary winding has been shown in FIG. 1, in practice additional secondaries would ordinarily be used. The secondary winding 13 is suitably coupled to an electric load circuit 14 that is assumed, for purposes of describing the preferred embodiment of my invention, to comprise electric traction motors and related propulsion and auxiliary equipment of an electric locomotive or self-propelled transit car. In this particular setting the power transformer 11 is located on-board the traction vehicle and has a power rating of the order of 3000 kva. Its primary winding 12 is connected for energization to a source of alternating current.

As is shown in FIG. 1, the a-c source for the power transformer 11 comprises stationary means 15 for supplying alternating current at substantially constant frequency (e.g., 60 Hz) and relatively high voltage with respect to ground (e.g., 25,000 volts) to a wayside conductor 16 (e.g., an overhead catenary) that extends parallel to the right-of-way of the traction vehicle, a suitable current collector 17 on the vehicle (e.g., a pantograph) that maintains sliding contact with the conductor 16, the separable main contacts of a power circuit breaker 18 (preferably of the vacuum breaker type) connected between the collector 17 and one terminal of the primary winding 12, an a-c conductor 19 connected between another terminal of winding 12 and a grounding block on the vehicle, and a path at ground potential (e.g., the platform, axles, and wheels of the traction vehicle and the rails of the track on which the vehicle wheels run) that returns to the stationary supply means 15. Such an a-c source is subject to interruptions that can occur either deliberately due to opening of the main contacts of the circuit breaker 18 or accidently due to momentary separation of the collector 17 and the wayside conductor 16 (i.e., pantograph bounce) or to phase breaks (not shown) in the conductor 16. Upon reenergizing the power transformer 11 following any such interruption, the primary winding 12 will draw magnetizing inrush current that can contain an undesirable d-c component as previously explained. In order to detect the d-c component of transformer inrush current, a system 20 is provided. While the detecting system 20 is herein described in conjunction with a transformer used on an electrically propelled traction vehicle, it is not limited to this context and is also well suited either for detecting the d-c component of inrush current in the primary windings of other power transformers that are energized by interruptable sources of alternating current or for detecting an appreciable d-c component of load or fault current that can transiently be present for other reasons in any transformer primary winding (e.g., when a secondary fault causes unsymmetrical loading of the transformer).

The detecting system 20 of my invention comprises a pair of current transducers 21 and 22 each having a saturable core, a primary winding (assumed hereinafter to be a single turn) linked to the core and connected in series with the conductor 19 so that the associated core is magnetized by the successive positive and negative half cycles of alternating current flowing between the power transformer primary winding and the a-c source, and a multiturn secondary winding on the same core. Preferably the core of each current transducer is a tape wound toroid of high permeability material such as grain oriented silicon steel having a very high maximum flux density. Other known core materials can alternatively be used, such as those that will give each current transducer the well-known "square" B-H or hysteresis loop.

Bias means is associated with the current transducers 21 and 22 for presaturating their respective cores in opposite directions by equal predetermined amounts of magnetomotive force (ampere-turns per unit core length, hereinafter referred to as "mmf"). The presaturating mmf is selected so that each core is maintained far into its saturation region in one direction. (For example, on a primary current basis the presaturation level may correspond to a current as large as 150 amperes, whereas a minimum exciting current of only 3 amperes will saturate the core.) While the bias means can take other equivalent forms well known in the art, such as separately excited biasing windings on the same cores but electrically isolated from the illustrated secondary windings of the respective transducers, in the preferred embodiment of my invention it comprises a suitable supply of d-c control power, represented in FIG. 1 by encircled plus and minus symbols, connected through a resistor 23 to the secondary winding 21s of the current transducer 21 and through another resistor 24 to the secondary winding 22s of the other current transducer 22. The d-c power supplied to the positive and negative control power terminals can be derived from any reliable source, such as a 75-volt battery 25 to which these terminals are connected by way of a battery switch 26. The undotted ends of the secondary windings of both current transducers 21 and 22 are shown connected in common to the relatively negative control power terminal which provides a reference potential for the circuits in the detecting system 20. The dot end of the secondary winding 21s is connected via a line A to the resistor 23, and the dot end of the secondary winding 22s is connected via a line B to the resistor 24.

The ohmic values of the resistors 23 and 24 are so selected that each of the secondary windings 21s and 22s is supplied with direct current of suitable magnitude to establish the aforesaid predetermined amount of presaturating mmf in the associated core. The windings of the two transducers 21 and 22 are oppositely poled (as indicated by the conventional polarity dots in FIG. 1) so that during positive half cycles of alternating current in the primary winding 12 of power transformer 11, when current is passing in a given direction in the single-turn primary windings of the current transducers 21 and 22, the magnetic flux produced by the latter windings will oppose the core magnetization provided by the bias means of a first one of the current transducers (e.g., transducer 21) but will aid the core magnetization provided by the bias means of the second current transducer (e.g., transducer 22), whereas during negative half cycles of transformer primary current, when current is passing in the opposite direction in the single-turn primary windings of the current transducers, the magnetic flux produced by the latter windings will aid the core magnetization provided by the bias means of the first current transducer but oppose the core magnetization provided by the bias means of the second transducer.

As will now be apparent to persons skilled in the art, an appreciable voltage is induced in the secondary winding of either one of the current transducers 21 and 22 only during those half cycles of primary current having the proper direction and sufficient peak magnitude to produce opposing flux that cancels the presaturation magnetization in the associated core and drives the core out of saturation. At other times when the core is saturated, flux excursions due to air core coupling will be very small and produce negligible secondary voltage. Because of the possibility that unusually high voltage transients can sometimes be induced in the secondaries of the current transducers 21 and 22, a pair of non-linear resistance elements 27 and 28 (preferably GE-MOV ® varistors) are respectively connected across the secondary winding 21s and the resistor 24 to dissipate such transients and protect the components of the detecting system 20 from harmful overvoltages.

In accordance with my invention, means is connected to the secondary windings 21s and 22s of the two current transducers for deriving an output signal in response to voltage induced in one of the secondary windings not matched by voltage induced in the other secondary winding. In its preferred embodiment this means comprises a pair of capacitors 31 and 32 and a pair of diodes 33 and 34. As is shown in FIG. 1, the first capacitor 31 and first diode 33 are connected in series with one another and with a current limiting resistor 35 across the secondary winding 21s of the current transducer 21, and the second capacitor 32 is connected in series with the second diode 34 and another current limiting resistor 36 across the secondary winding 22s of the other current transducer 22. Each of the capacitors 31 and 32 has one plate connected in common to the undotted ends of the secondary windings of both current transducers 21 and 22, which plate is therefore at the reference potential of the relatively negative control power terminal. The other plate of the first capacitor 31 is connected via a line C to the resistor 35, and the other plate of the second capacitor 32 is connected via a line D to the resistor 36. The first diode 33 is poled so that charging current can flow in the first capacitor 31 only during relatively negative half cycles of voltage induced in the secondary windings 21s (i.e., during those half cycles when the potential of line A is negative with respect to the reference potential), and the second diode 34 is poled so that charging current can flow in the second capacitor 32 only during relatively negative half cycles of voltage induced in the secondary winding 22s (i.e., when the potential of line B is negative with respect to the reference potential). A pair of resistors 37 and 38 are connected to shunt with the respective capacitors 31 and 32 and provide discharge paths for the capacitors during intervals when charging currents are not flowing.

With the arrangement just described there is developed across the first capacitor 31 a unipolarity voltage having a magnitude dependent on the magnitude of alternating voltage induced in the secondary winding 21s during any half cycles of power transformer current having the proper direction and sufficient peak magnitude to unsaturate the core of the current transducer 21, and there is developed across the second capacitor 32 a unipolarity voltage having a magnitude dependent on the magnitude on the magnitude of alternating voltage induced in the secondary winding 22s during alternate half cycles of power transformer current having the proper direction and sufficient peak magnitude to unsaturate the core of the other transducer 22. Any voltage difference between the two capacitors 31 and 32 indicates an offset (i.e., a d-c component) in the waveform of the power transformer current, and the magnitude of the difference is a measure of the magnitude of the offset.

Accordingly, the voltage difference between the lines C and D in FIG. 1 serves as the output signal that is derived by the detecting system 20 in response to a d-c component of alternating current in the power transformer winding 12. To sense the presence of this signal, an operating coil 40 of an electromagnetic relay 41 is connected between the lines C and D for energization in accordance with the voltage difference between the two capacitors 31 and 32. The electromagnetic relay 41 remains inoperative so long as there is essentially no difference between the magnitudes of the unipolarity voltages across the two capacitors 31 and 32. However, in response to a voltage difference of at least a predetermined minimum magnitude (e.g., 7.0 volts) the operating coil 40 of this relay will actuate a normally open contact 42 that is connected across the control power terminals in series with a line 43 and an operating coil 44 of a second electromagnetic relay 45. The capacitors 31 and 32 and their respective shunt resistors 37 and 38 perform the function of RC filters to prevent false pickup of the relay 41 in response to relatively short term transients and to prevent relay chatter once picked up.

Having described the basic components and arrangement of the detecting system 20 shown in FIG. 1, I will now review its operation with the aid of FIGS. 2 and 3. In FIG. 2 the trace 47 depicts a few early cycles of inrush current in the primary winding 12 of the power transformer 11 for a condition wherein the transformer is initially connected to its a-c source at an unfavorable part of the alternating voltage wave and the inrush current contains an appreciable d-c component of relatively positive polarity (see the broken-line trace 48). In the first current transducer 21 the successive cycles of inrush current 47 are in a direction to oppose the presaturating mmf. So long as the peak magnitude of this current amply exceeds a threshold level determined by the presaturating mmf, the core of the transducer 21 will be driven completely through its major hysteresis loop during each cycle of inrush current, and an appreciable alternating voltage (such as shown by trace A in FIG. 2) is induced in the associated secondary winding 21s. The diode 33 clips the positive half cycles of this induced voltage, and the first capacitor 31 smooths the relatively negative half cycles. Consequently, for the condition assumed, an appreciable negative voltage is developed on the line C of FIG. 1, and this voltage is represented by the broken-line trace C in FIG. 2 (where the initial cycles required to charge the capacitor 31 from its quiescent state are ignored).

At the same time, in the second current transducer 22 the successive cycles of inrush current 47 are in a direction to aid the presaturating mmf. Therefore the voltage induced in the secondary winding 22s is trivial and, as is depicted in FIG. 2 by the trace labeled "B,D," the voltage on line B, as well as the voltage across the second capacitor 32 (line D), is essentially zero with respect to the reference potential of the relatively negative control power terminal. If the d-c component of inrush current were of negative polarity instead of positive as shown in FIG. 2, the roles of the two transducers 21 and 22 would be reversed. In either case the resulting voltage difference between lines C and D indicates that the transformer primary current contains an undesirable d-c component. As soon as this voltage difference exceeds the predetermined minimum magnitude required to operatively energize the coil 40 of the relay 41, the relay 41 picks up and closes its normally open contact 42. Once picked up, the relay 41 remains in this state until the d-c component of transformer current has sufficiently subsided to allow the unbalance between the capacitor voltages to decrease to such a low magnitude (e.g., 2.5 volts) that the relay drops out.

It will be observed that the detecting system 20 responds to a d-c component of transformer primary current only if the peak magnitude of current initially equals or exceeds the predetermined threshold level required to unsaturate the core of one of the current transducers 21 and 22. For one application of my invention this threshold level was established at approximately 150 amperes by using transducers having 10,000-turn secondaries and by selecting resistors 23 and 24 of 5,600 ohms. In this particular application it was found that if the initial peak magnitude were insufficient to cause the relay 41 to pick up, the d-c component of inrush current would be harmlessly small—e.g., less than 2.6 amperes after one second.

In FIG. 3 the trace 49 depicts a few early cycles of inrush current in the transformer primary winding for a condition wherein the transformer is initially connected to its a-c source at the most favorable part of the alternating voltage wave. Consequently the inrush current contains no d-c component and its wave shape is symmetrical. Assuming that this current has an amplitude higher than the predetermined threshold level of the detecting system 20, its successive positive half cycles will induce an alternating voltage A in the secondary winding 21s of the first current transducer 21, and its successive negative half cycles will induce an alternating voltage B in the secondary winding 22s of the second transducer 22. The voltages A and B have approximately equal magnitudes, and consequently there is no appreciable magnitude difference between the resulting unipolarity voltages on lines C and D, respectively (again ignoring the initial cycles required to charge each of the capacitors 31 and 32 from its quiescent state). Due to the absence of the prerequisite voltage difference between lines C and D, the detecting system has no output signal and the relay 41 properly remains dropped out.

In the event that a d-c component of inrush current is detected by the detecting system 20, it is desirable to attenuate this component and prevent its possible interference with vehicle warning and protective equipment (not shown). For this purpose in the illustrated embodiment of my invention there is additionally provided a contactor 51 that responds to operation of the relay 41 by inserting a resistor 50 in series with the alternating current flowing between the power transformer winding 12 and the a-c source. The contactor 51 is preferably of an electro-pneumatic type with a fast opening characteristic (e.g., air closed and spring opened under the control of magnetic valves). As is indicated in FIG. 1, a valve solenoid 52 of the contactor 51 is connected for energization to the control power terminals through a normally closed contact 46 of the previously mentioned relay 45, whereby the contactor 51 is closed under normal operating conditions but will open any time the relay 45 picks up as a result of the relay 41 being picked by an output signal between lines C and D of the detecting system 20.

A first contact 53 of the contactor 51 is connected across the resistor 50 to short circuit this resistor so long as the contactor 51 is closed, but whenever the contactor 51 opens the contact 53 is moved to an open position to effectively insert the resistor 50 in series with the conductor 19 between the transformer primary winding 12 and the ground return path. The resistor 50 has an appropriate ohmic value (e.g., 4.2 ohms) to yield, in combination with the inductance of the power transformer 11, a time constant that ensures that a maximum d-c component of inrush current will decay to a harmlessly low magnitude (e.g., 2.6 amperes) within one second. Opening of the contactor 51 is also accompanied by the closing of a second contact 54 that can be used to reset a reference in the propulsion control circuits of the vehicle (not shown).

In another aspect of the present invention, means is provided for testing the detecting system 20 so as to confirm that it will operate properly when needed. As can be seen in FIG. 1, the testing means comprises a relay 61 having a normally open contact 60 connected in series with a resistor 63 between the line C and the positive control power terminal. By closing the contact 60, a test voltage equal to the control power voltage is selectively applied to the first capacitor 31 of the detecting system 20. This voltage differs from the voltage across the second capacitor 32 by more than the aforesaid predetermined minimum magnitude required to operatively energize the coil 40 of the relay 41, and consequently both of the relays 41 and 45 will pick up if sound.

The testing relay 61 includes an operating coil 62 that is preferably connected across the control power terminals in series with an interlock 18b of the power circuit breaker 18. Whenever the main contacts of the circuit breaker 18 are open, the interlock 18b is closed, whereby the relay 61 is picked up and the contact 60 is closed. The circuit breaker 18 includes a conventional operating mechanism 64 that enables its main contacts to be either closed or tripped open in response to the application of alternative close or trip signals to terminals 65 and 66, respectively. A two-position close/trip switch 67 is provided. When moved to its left-hand position shown in FIG. 1, the switch 67 will bridge a pair of contacts 68 to complete a connection between the positive control power terminal and the trip terminal 66, thereby initiating an opening operation of the breaker mechanism 64. Upon opening of the circuit breaker 18, the interlock 18b is moved from open to closed positions, the relay 61 picks up to close its contact 60, the test voltage is applied to the line C of the detecting system 20, the relays 41 and 45 pick up (assuming the detecting system is not defective), the contact 46 of the relay 45 opens to deenergize the valve solenoid 52 of the contactor 51 which thereupon is actuated to its open position, and the contact 53 of the contactor 51 opens to insert the resistor 50 in series with the transformer primary winding 12. As the contactor 51 opens, a third contact 55 of this contactor is moved from its open position to a normally closed position.

The last-mentioned contact 55 is connected in a circuit that includes an operating coil 70 of an auxiliary relay 71 and a pair of contacts 69 of the breaker close/trip switch 67. By moving the switch 67 to its right-hand position with the contact 55 closed, the contacts 69 will be bridged and the auxiliary relay 71 actuated to close its normally open contact 72 that completes a connection between the positive control power terminal and the close terminal 65 of the breaker mechanism 64, thereby initiating a closing operation of the mechanism 64 and reclosing the main contacts of the circuit breaker 18. Note that when the switch 67 is moved to its right-hand position the auxiliary relay 71 will not pick up to close the power circuit breaker 18 unless the contact 55 of the contactor 51 is closed. This ensures that before closing the main contacts of circuit breaker 18 the resistor 50 is inserted to attenuate any d-c component contained in the initial transformer inrush current.

Note also that the closed state of the contact 55 indicates that the two relays 41 and 45 and the contactor 41 have all operated correctly in response to the application of the test voltage on the line C of the detecting system 20.

Upon closing the circuit breaker 18 as above described, the interlock 18b opens, the testing relay 61 drops out thereby opening its contact 60, and the unbalancing test voltage is removed from the line C of the detecting system 20. The capacitor 31 will now discharge and the voltage difference between the lines C and D will soon decrease to such a low magnitude that the relay 41 drops out (unless there is asymmetry between positive and negative half cycles of transformer primary current and the peak magnitude of current exceeds the threshold level to which the detecting system 20 responds), whereupon the relay 45 drops out and the contact 46 closes to energize the valve solenoid 52 of the contactor 51 which is then actuated to its closed position. Consequently the first contact 53 of the contactor 51 closes to short circuit the resistor 50 and thereby permit full energization of the power transformer 11 by the a-c source, and the third contact 55 opens to drop out the auxiliary relay 71.

Occasionally the apparatus shown in FIG. 1 may be out of service, with the power circuit breaker 18, the battery switch 26, and consequently the contactor 51 all in their open states. When it is desired to restore control power, the battery switch 26 is reclosed manually. The return of control power energizes the valve solenoid 52, thereby causing the contactor 51 and its contact 53 to close, and since the breaker interlock 18b is now closed, the operating coil 62 of the testing relay 61 is also energized. When the testing relay 61 picks up, its contact 60 closes to apply the test voltage to the line C of the detecting system 20, and if all components are working properly both of the relays 41 and 45 will then pick up. This opens the contact 46 of the relay 45 and deenergizes the valve solenoid 52 so that the contactor 51 is actuated to its open position, whereupon the contact 53 opens to insert the resistor 50 in series with the transformer primary winding 12 and the contact 55 closes to energize the operating coil 70 of the auxiliary relay 71 (assuming that the breaker close/trip switch 67 is in its right-hand position). When the auxiliary relay 71 picks up, a close signal is supplied through its contact 72 to the breaker operating mechanism 64 which causes the main contacts of the circuit breaker 18 to close and connect the power transformer winding 12 for energization to the a-c source. At the same time, the interlock 18b opens, the testing relay 61 drops out thereby opening its contact 60, and the unbalancing test voltage is removed from the line C of the detecting system 20. As previously explained, this allows the relays 41 and 45 and the contactor 51 to return to the states in which they are respectively shown in FIG. 1.

While I have shown and described the preferred form of my invention by way of illustration, many modifications will undoubtedly occur to those skilled in the art. I therefore contemplate by the claims that conclude this specification to cover all such modifications as fall within the true spirit and scope of the invention.

What I claim as new and desire to secure by Letters Patent of the United States is:

1. A system for detecting a d-c component of current in a power transformer winding energized by an a-c source, comprising:
   a. first and second current transducers each having a saturable core adapted to be magnetized by alternating current flowing between the power transformer winding and the a-c source and having a secondary winding on said core;
   b. bias means associated with said current transducers for presaturating their respective cores in opposite directions by equal predetermined amounts of magnetomotive force; and
   c. means connected to the secondary windings of said first and second current transducers for deriving an output signal in response to voltage induced in one of said secondary windings as a result of alternating current containing a d-c component in the power transformer winding, which current has sufficient peak magnitude to unsaturate the core of one of said current transducers, said output signal deriving means being arranged to prevent the output signal from being derived whenever voltages of substantially equal magnitudes are induced in both of said secondary windings as a result of symmetrical alternating current of relatively high amplitude in the power transformer winding.

2. The detecting system of claim 1 wherein said bias means comprises means connected to the respective secondary windings of said current transducers for supplying to each secondary winding direct current of suitable magnitude to establish said predetermined amount of presaturating magnetomotive force in the associated core.

3. The detecting system of claim 1 wherein there is provided additional means responsive to said output signal for inserting a resistor in series with the alternating current flowing between the power transformer winding and the a-c source to attenuate said d-c component.

4. A system for detecting a d-c component of current in a power transformer winding energized by an a-c source, comprising:
   a. first and second current transducers each having a saturable core adapted to be magnetized by alternating current flowing between the power transformer winding and the a-c source and having a secondary winding on said core;
   b. bias means associated with said current transducers for presaturating their respective cores in opposite directions by equal predetermined amounts of magnetomotive force; and
   c. means connected to the secondary windings of said first and second current transducers for deriving an output signal in response to voltage induced in one of said secondary windings as a result of alternating current containing a d-c component in the power transformer, winding, which current has sufficient peak magnitude to unsaturate the core of one of said current transducers, said output signal deriving means comprising
      (i) a first capacitor and a first diode connected in series with one another across the secondary winding of said first current transducer, whereby the magnitude of unipolarity voltage across said first capacitor is dependent on the magnitude of alternating voltage induced in the secondary winding of said first current transducer during any half cycles of power transformer current in a given direction and of sufficient peak magnitude to unsaturate the core of said first transducer, and (ii) a second capacitor and a second diode connected in series with one another across the secondary winding of said second current transducer, whereby the magnitude of unipolarity voltage across said second capacitor is dependent on the magnitude of alternating voltage induced in the secondary winding of said second current transducer during any half cycles of power transformer current in the opposite direction and of sufficient peak magnitude to unsaturate the core of said second transducer, said output signal comprising the difference between the voltages across the respective capacitors.

5. The detecting system of claim 4 wherein there is additionally provided an electromagnetic relay having an operating coil connected across said first and second capacitors for energization in accordance with the voltage difference therebetween and having a contact actuated by said coil in response to said voltage difference attaining at least a predetermined minimum magnitude.

6. The detecting system of claim 4 wherein there is provided means for selectively applying to said first capacitor a test voltage that differs from the voltage across said second capacitor by more than a predetermined minimum magnitude.

* * * * *